United States Patent [19]
Klein

[11] Patent Number: 6,011,541
[45] Date of Patent: Jan. 4, 2000

[54] DUAL POINTING DEVICE

[75] Inventor: Dean A. Klein, Eagle, Id.

[73] Assignee: Micron Electronics, Inc., Nampa, Id.

[21] Appl. No.: 08/843,289

[22] Filed: Apr. 11, 1997

[51] Int. Cl.[7] ................................................... G06F 3/00
[52] U.S. Cl. ...................... 345/156; 345/145; 345/157; 345/160; 345/168
[58] Field of Search ................................. 345/145, 156, 345/157, 160, 161, 163, 164, 167, 168, 173, 179, 184

[56] References Cited

U.S. PATENT DOCUMENTS

| | | | |
|---|---|---|---|
| 5,021,771 | 6/1991 | Lachman | 345/168 |
| 5,414,422 | 5/1995 | Allen | 345/168 |
| 5,440,325 | 8/1995 | Edmark, III | 345/145 |
| 5,666,499 | 9/1997 | Baudel et al. | 345/157 |
| 5,675,360 | 10/1997 | Takegoshi et al. | 345/160 |
| 5,694,150 | 12/1997 | Sigona et al. | 345/145 |

*Primary Examiner*—Mark R. Powell
*Assistant Examiner*—Vincent E. Kovalick
*Attorney, Agent, or Firm*—Dorsey & Whitney LLP

[57] ABSTRACT

The present invention relates to an apparatus for enabling a user to make a seamless transition between using a primary pointing device and a secondary pointing device on a computer to interact with the computer. The apparatus comprises a first microcontroller and a second microcontroller, wherein the first and second microcontrollers are electrically connected to each other. A primary pointing device input is connected to the first microcontroller, and a secondary pointing device input is connected to the second microcontroller. A system microcontroller is electrically connected to the first microcontroller. The first and second microcontrollers share a first and second switch. Computer software instructions operative by the first microcontroller determine which of the primary pointing device and the secondary pointing device is in use. If the primary pointing device is in use, then the first microcontroller process the switch actions (i.e., the data from the primary pointing device input element). The processed data output by the first microcontroller is transmitted by the first microcontroller to the system microcontroller.

If the secondary pointing device is in use, then the software operative by the first microcontroller causes the first microcontroller to ignore the switch actions. By ignoring the switch actions, the data processed by the second microcontroller, which is sent to the first microcontroller, is transmitted to the system microcontroller. Thus, this apparatus enables a use to make a seamless transition between the primary and secondary pointing device and use either pointing device at any time.

44 Claims, 4 Drawing Sheets

DUAL POINTING DEVICE

TECHNICAL FIELD

The present invention relates to the use of a primary and a secondary pointing device on a computer keyboard for use with a computer. In particular, the present invention relates to allowing a user to make a seamless transition between using the primary pointing device and the secondary pointing device on the computer, thereby enabling a user to use either pointing devices at any time.

BACKGROUND OF THE INVENTION

Generally, a computer has a processor, memory, monitor, keyboard, and a pointing device, often called a "mouse". The mouse may be an external mouse or an internal mouse, i.e., one built into the keyboard. Some computers, particularly some notebook computers, have two internal mice: (1) a strain gage mouse and (2) a touch pad mouse. In conventional computers that have two mice, one is treated as controlling or primary, i.e., the computer normally accepts only its input signals. The strain gage mouse is usually the primary mouse and the touch pad mouse is usually the secondary mouse. Each of the primary and secondary mice has its own separate electronics, but they share the mouse button switches, the actuation of which enables the user to perform a function such as placing a cursor at a particular location or selecting a portion of text in a particular document.

Currently, computers that have two mice do not allow a user to seamlessly use either mouse, because the actuation of one of the shared mouse buttons does not identify which mouse should have its input signals accepted. As a result, currently, the user must preselect through the SETUP program only one of the two mice, as the mouse the user will be using in the operation of the computer. Alternatively, the computer manufacturer may provide two separate mouse buttons for each mouse.

Having a user preselect one of the two internal mice to be used inconveniences the user in two ways. First, the user must initially configure the computer through the SETUP program to select the mouse the user desires to use. Second, once the user has selected a mouse, the other mouse on the computer cannot be used, unless the user reconfigures the computer through the SETUP program. Clearly, providing the user the capability to use either mouse without having to reconfigure the computer through the SETUP program is desirable.

The alternative solution of providing separate switches for each mouse increases the manufacturing costs for the computer. Thus, in order to avoid increased manufacturing costs, an apparatus in which two mice share a pair of switches and enable a user to make a seamless transition to use either mouse at any time is desirable.

SUMMARY OF THE INVENTION

The present invention relates to an apparatus for enabling a user to make a seamless transition between using a primary pointing device and a secondary pointing device on a computer to interact with the computer, thereby enabling the user to use either pointing device at any time. In one embodiment, the apparatus comprises a first microcontroller and a second microcontroller, wherein the first and second microcontrollers are electrically connected to each other. A primary pointing device input is connected to the first microcontroller, and a secondary pointing device input is connected to the second microcontroller. A system microcontroller is electrically connected to the first microcontroller. The first and second microcontrollers share a first and second mouse switch. Computer software instructions executed by the first microcontroller determine which of the primary pointing device and the secondary pointing device is in use. If the primary pointing device is in use, then the first microcontroller responds to the switch actions (i.e., accepts the data from the primary pointing device input element). The processed data output by the first microcontroller is transmitted by the first microcontroller to the system microcontroller.

If the secondary pointing device is in use, then the software executed by the first microcontroller causes the first microcontroller to ignore the switch actions (i.e., any response to the status of the mouse switches is inhibited). But the second microcontroller responds to the switch actions and accepts the data from the secondary pointing device input element. Thus, the data is processed by the second microcontroller and sent to the first microcontroller, which then communicates the data sent by the second microcontroller to the system microcontroller. Thus, this apparatus enables a user to make a seamless transition between the primary and secondary pointing device and use either pointing device at any time.

DETAILED DESCRIPTION OF THE PREFERRED EMBODIMENT

Figure 1:
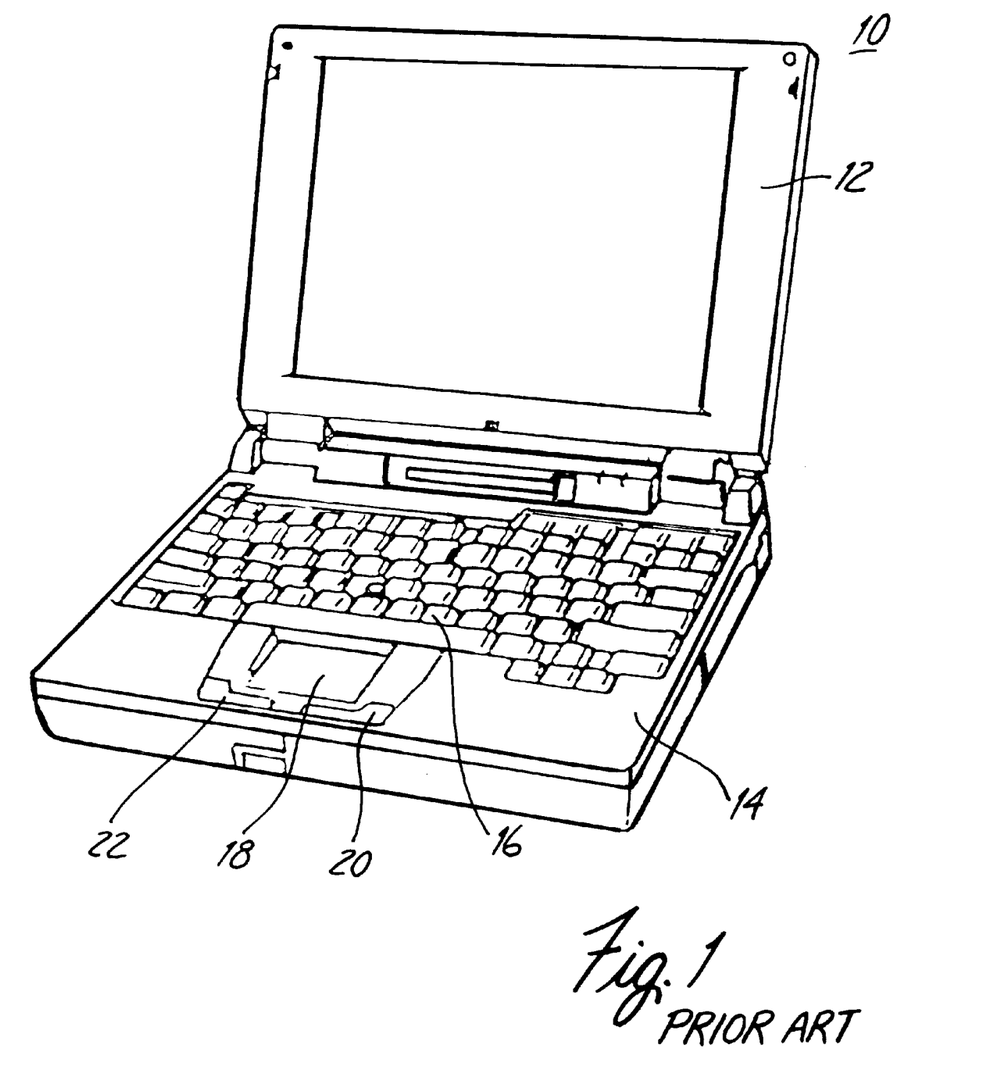
FIG. 1 shows an isometric view of a prior art computer with a keyboard having two pointing devices to which the invention is applicable.
Figure 2:
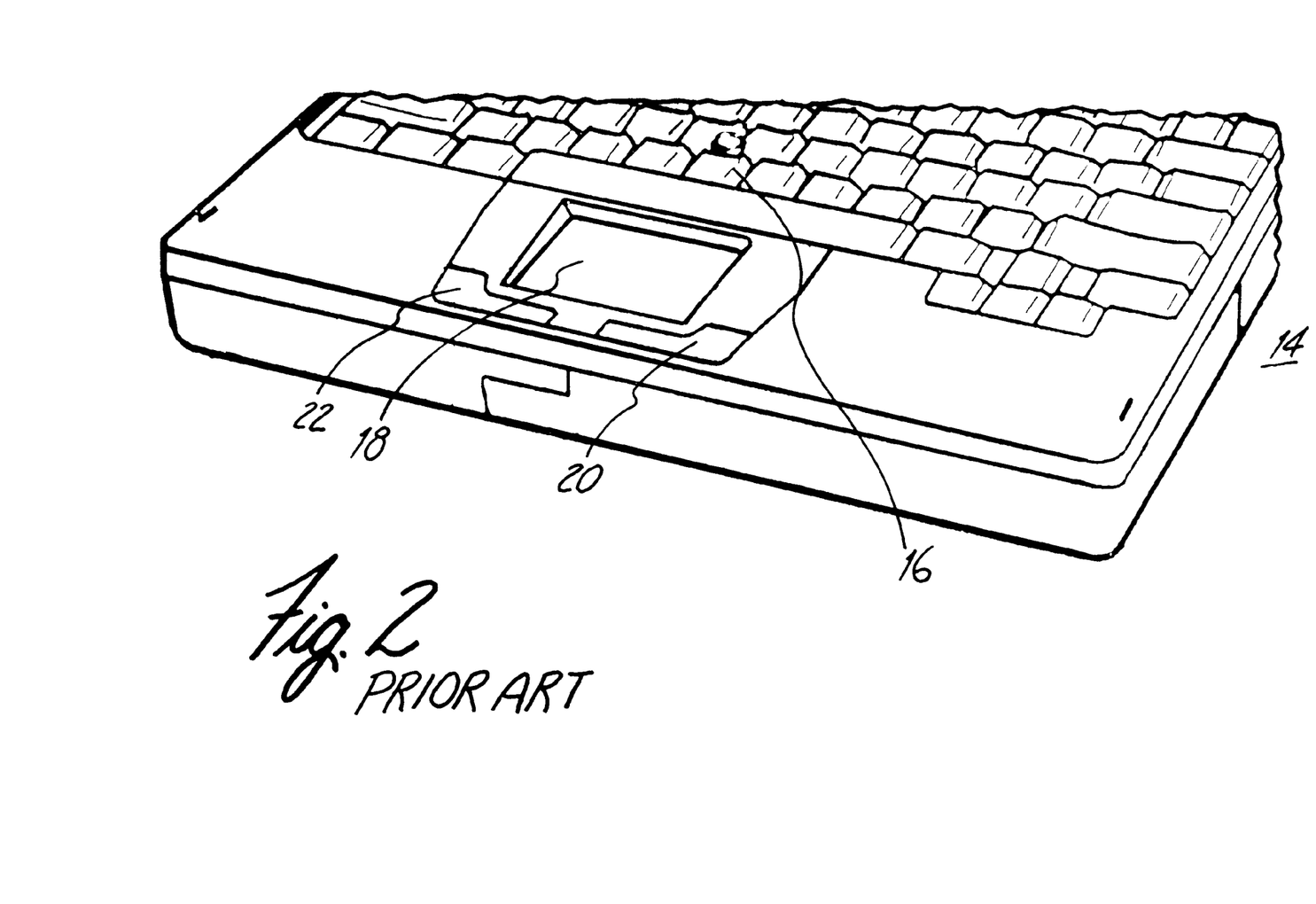
FIG. 2 shows an isometric view of a prior art keyboard having two pointing devices to which the invention is applicable with a portion of the keyboard cut away.

FIG. 1 shows a notebook computer 10 having a monitor 12 and a keyboard 14. As shown in FIGS. 1 and 2, the keyboard 14 has two pointing devices: a primary pointing device 16 and a secondary pointing device 18. In the preferred embodiment, the primary pointing device 16 is a pointing stick mouse, and the secondary pointing device 18 is a touch pad mouse.

Continuing to refer to FIGS. 1 and 2, the primary and secondary pointing devices 16, 18 share a first mouse switch 20 and a second mouse switch 22. Although the present invention is described with two mouse switches 20, 22, one or more mouse switches shared by the primary and secondary pointing device 16, 18 may be used. In the present invention, a user, at any time, may transition between using the primary and secondary pointing device 16, 18 and use either pointing device, 16, 18 with either mouse switch 20, 22 to interact with the computer 10.

Figure 3:
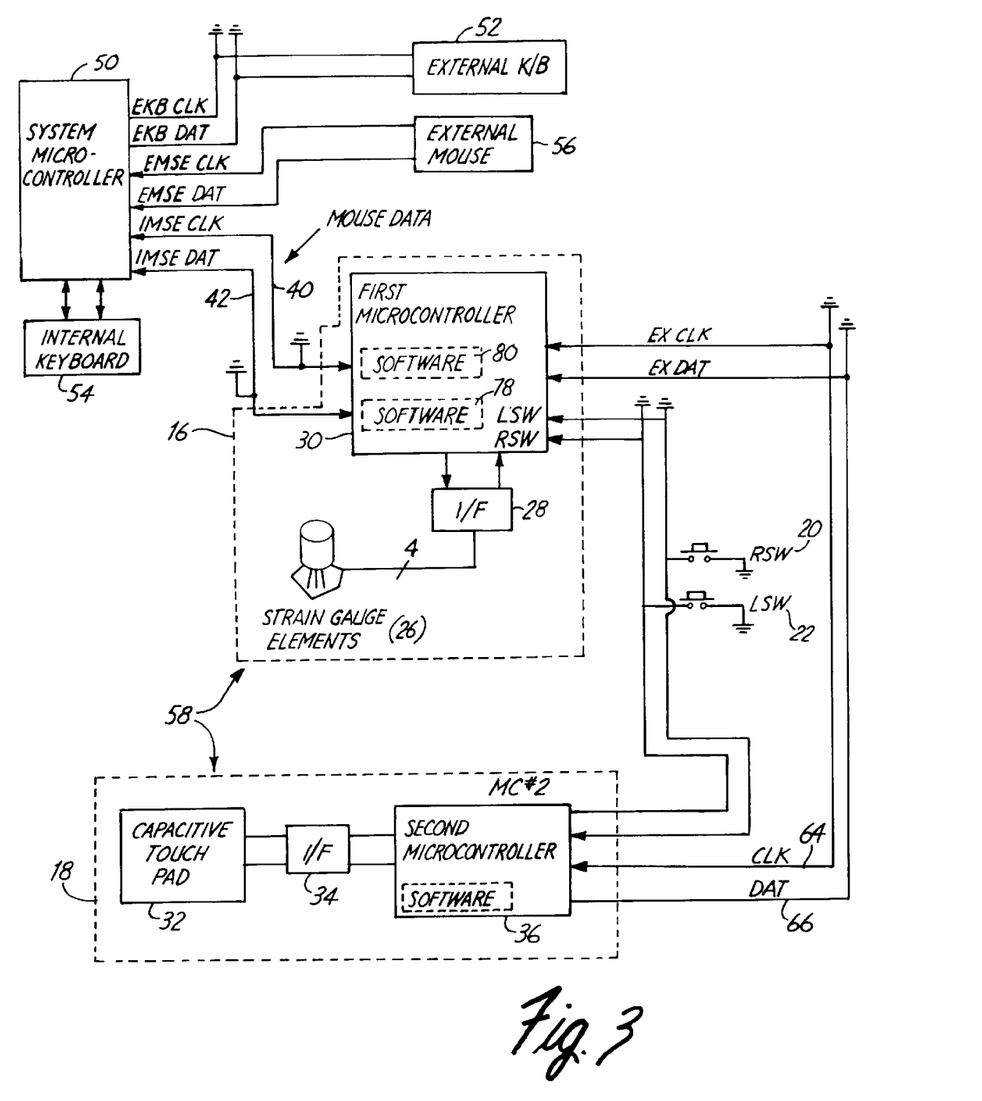
FIG. 3 is a block diagram of each of the two pointing devices and their relationship to each other, the system microcontroller, and the invention.

With reference to FIG. 3, the components of the primary pointing device 16 and the secondary pointing device 18, their relationship to each other, and their relationship to the system microcontroller 50 of the computer 10 will be described. As shown in FIG. 3, the system microcontroller or system microprocessor 50 may be connected to, among other elements, an external keyboard 52, an internal keyboard 54, an external pointing device or an external mouse 56, and an internal pointing device or an internal mouse 58. For the present invention, there are two internal mice 58: the primary pointing device 16 and the secondary pointing device 18. The two pointing devices 16, 18 share the first mouse switch 20 and the second mouse switch 22.

Continuing to refer to FIG. 3, the primary pointing device 16 comprises a primary pointing device input module 26, a first interface 28, and a first microcontroller 30. The primary pointing device input module 26 is connected to the first microcontroller 30 via the first interface 28. Also, the first mouse switch 20 and the second mouse switch 22 are electrically connected to the first microcontroller 30. In the preferred embodiment, the primary pointing device input module 26 is a set of strain gauge elements linked to a pointing stick mouse. While, in the preferred embodiment, the first microcontroller 30 is implemented using a processor manufactured by Zilog having the model number Z86C8, any conventional processor such as a Signetics 8051 derivative processor may be used to implement the first microcontroller 30. The first interface 28 may be implemented using a Dallas Semiconductor, model no. DS1267010.

The secondary pointing device 18 comprises a secondary pointing device input module 32, a second interface 34, and a second microcontroller 36. The secondary pointing device input module 32 is connected to the second microprocessor 36 via the second interface 34. Also, the first mouse switch 20 and the second mouse switch 22 are electrically connected to the second microcontroller 30. The secondary pointing device 18 may be implemented using a Cirque Model TSM937 touch pad mouse, which uses a capacitive touch pad as the input module 32.

With continuing reference to FIG. 3, the electrical interconnections between the various components will be described. The first microcontroller 30 is electrically connected to a system microcontroller 50. In one embodiment, an internal mouse clock line 40 and an internal mouse data line 42 connect the system microcontroller 50 and the first microcontroller 30. Similarly, the first and second microcontrollers 30, 36 may be interconnected via an interpointing device clock line 64 and an interpointing device data line 66.

In the configuration shown in FIG. 3, all data transmitted to and received from the system microcontroller 50 passes through the first microcontroller 30. That is, because the internal mouse clock line 40 and the internal mouse data line 42, which are the pathways for communication of mouse data to the system microcontroller 50, connect the system microcontroller 50 with the first microcontroller 30, the first microcontroller 30 is used in the communication of data to the system microcontroller 50, regardless of whether the data being communicated was received by the first or second microcontroller 30, 36. For the second microcontroller 36 to send data to the system microcontroller 50, it first sends the data to the first microcontroller 30, which passes the data to the system microcontroller 50.

As shown in FIG. 3, the first microcontroller 30 has associated with it primary pointing device software 78 and dual pointing device enabling software 80. The primary pointing device software 78 allows a user to interact with the computer 10 via the user's manipulation of the primary pointing device input module 26 and the first or second mouse switch 20, 22. The primary pointing device software 78 processes the data from the primary pointing device input module 26 and sends the processed data or mouse data to the system microcontroller 50 via the internal mouse data line 42.

In the configuration shown in FIG. 3, assuming the user has not used SETUP to change the primary pointing device, the first microcontroller 30 of the primary pointing device 16 assumes that all mouse switch actions (i.e., the actuation of a mouse switch 20, 22) require it to process input data from input module 26, even when the user seeks data input via the secondary pointing device input module 32. Thus, when a mouse switch 20, 22 is pressed, the first microcontroller 30 will not pass any data transmitted by the second microcontroller 36 to the first microcontroller 30 via the interpointing device data line 66. Thus, with device 16 set as the primary pointing device and without the dual pointing device enabling software 80, the secondary pointing device 18 is effectively disabled.

Figures 4, 5, 6:
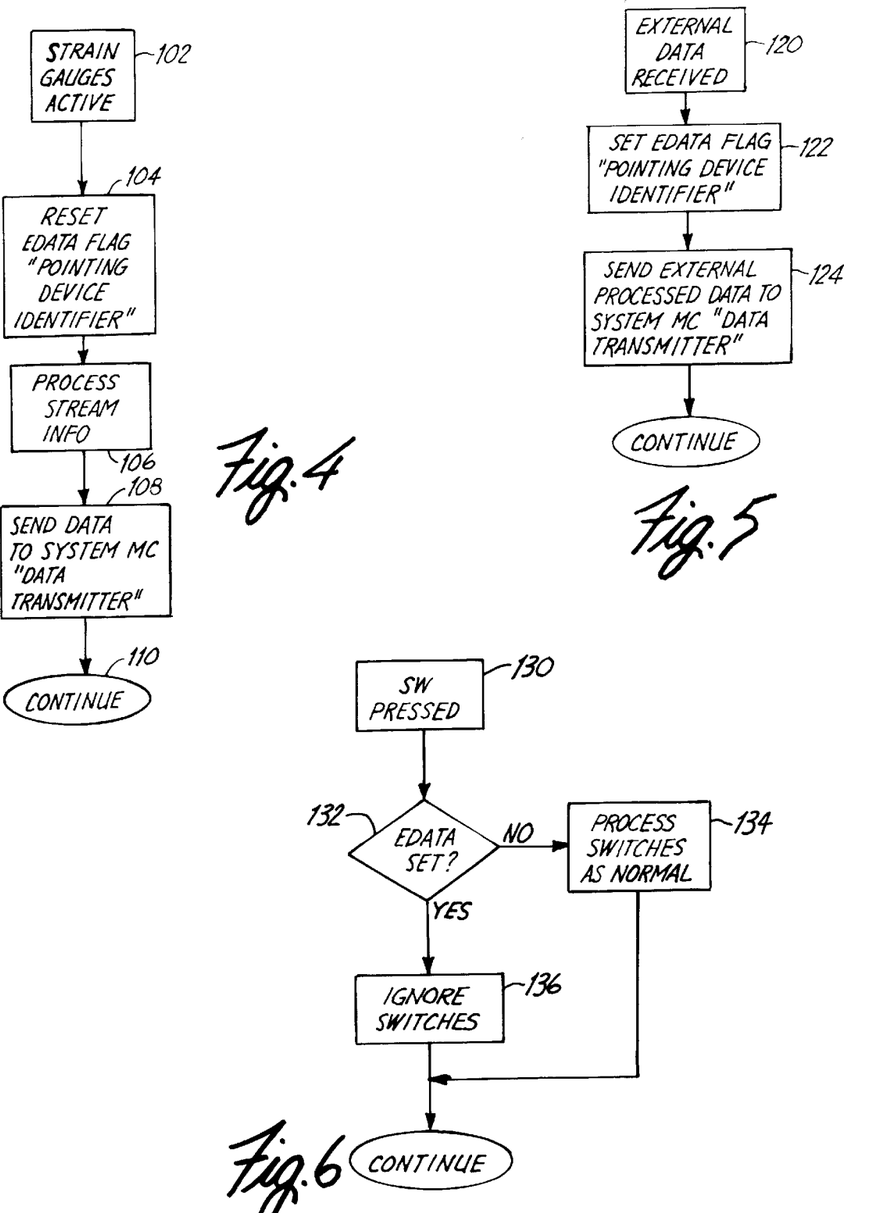
FIGS. 4–6 are flow charts of steps followed by the software of the present invention to enable a user to make a seamless transition to use either the primary or secondary pointing device at any time.

The dual pointing device enabling software 80 of the present invention makes the transition from using one or the other of the primary or secondary pointing devices 16, 18 possible without reconfiguring with the SETUP program. The dual pointing device enabling software 80 is merged or linked to the primary pointing device software 78 for the primary pointing device 16. With reference to FIG. 4–6, the software 80 will be described.

The general functions of the dual pointing device enabling software 80 are: (1) to determine which of the two pointing devices is in use when one or the other is actuated; (2) to set an EDATA flag to indicate which pointing device is in use or was most recently used; and (3) to cause the input data from the pointing device in use to be communicated to the system microcontroller 50. The software 80 may be part of a pointing device service program that loops continuously to pick up input that may arise from either of the dual pointing devices 16, 18 at any time. Such input arises when the user actuates one or the other of the primary or secondary pointing device input modules 26, 32.

FIG. 4 shows the actions performed by one embodiment of the software 80 when the user uses the primary pointing device 16 for interacting with the computer 10. At Block 102, the primary pointing device input module 26 is activated by the user; that is, the strain groups show user actuation sensed at interface 28 and microcontroller 30. At Block 104, the software 80 causes the status indicator or a status flag entitled EDATA to be reset ("status modifier") to indicate that the primary pointing device 16 is being used ("pointing device identifier"). The user continues to use the primary pointing device 16 to interact with the computer 10. At Block 106, the stream of information provided by the user through the primary pointing device input element 26 is processed by the first microcontroller 30. This processed data or mouse data is transmitted to the system microcontroller 50 via the internal mouse data line 42 ("data transmitter"). At Block 108, when the user actuates a mouse switch 20 or 22, the processed data related to the actuation of a mouse switch 20, 22 is processed and this mouse data is sent to the system microcontroller 50 via the internal mouse data line 42.

Next with reference to FIG. 5, the actions performed by software 80 in response to use of the secondary pointing device 18 will be described. At Block 120, the user actuates the secondary pointing device input module 32 (touch pad) of the secondary pointing device 18. This use is sensed by the second microcontroller 36 and the second microcontroller 36 processes the information provided by the user from the secondary pointing device input module 32. This processed information or secondary mouse data is sent via the interpointing device data line 66 to the first microcontroller 30. In response to receiving the secondary mouse data from the second microcontroller 36 of the secondary pointing device 18, at Block 122, the software 80 causes the status indicator or the status flag (i.e., the EDATA flag) to be set ("status modifier"), thereby, indicating that the secondary pointing device 18 is in use. At Block 124, because the EDATA flag is set to indicate that the secondary pointing device 16 is in use, the first microcontroller 30 sends the secondary mouse data that it received from the second microcontroller 36 to the system microcontroller 50. Next, when the user actuates a mouse switch 20 or 22, this switch action is processed by the second microcontroller 36. This secondary mouse data transmitted to the first microcontroller 30 via the interpointing device data line 66 which is then sent to the system microcontroller 50 via the internal mouse data line 42. As will be explained in more detail below, the software 80 inhibits any response by the first microcontroller 30 to switch actions of either the first and second mouse switch 20, 22.

Prior to actuation of a mouse switch 20, 22, when the input module 26, 32 for the primary and secondary pointing devices 16, 18 is used, the following actions occur: (1) the EDATA flag is modified to indicate which pointing device 16, 18 is being used; (2) when the primary pointing device is being used, the data input through the primary pointing device input 26 is processed and transmitted to the system controller 50 by the first microcontroller 30; and (3) when the secondary pointing device is being used, data input via the second pointing device input module 32 is processed by the second microcontroller 36 and sent to the first microcontroller 30, which sends the data to the system microcontroller 50. Thus, when a user begins to use a input module 26, 32, the status of the EDATA flag is modified to indicate which pointing device 16, 18 is in use, and based on that status, the first microcontroller will either begin processing data it received from the input module 26 and then sending the data to the system microcontroller 50 or begin to send data processed by the second microcontroller 36 and sent to the first microcontroller 30 to the system microcontroller 50.

With reference to FIG. 6, the actions performed by the software 80 to ensure that the secondary mouse data provided by the second microcontroller 36 is passed to the system microcontroller 50 when a mouse switch 20, 22 is actuated will be described. At Block 130, when the user, while using either the primary pointing device 16 or the secondary pointing device 18 actuates a mouse switch 20, 22, the software 80 performs the following actions. At Block 132, the software determines whether the EDATA flag has been set. Consequently, when the primary pointing device 16 is being used, the EDATA flag is not set, thereby, indicating that the primary pointing device 16 is being used. Whereas, when the secondary pointing device 18 is being used, the EDATA flag is set, thereby, indicating that the secondary pointing device 18 is currently being used or was last used.

At Block 134, if the EDATA flag is not set (i.e., the primary pointing device 16 is being used or was last used), then the mouse switches 20, 22 are processed based on the user's input through the primary pointing device 16 as described with reference to FIG. 4. The mouse data, resulting from the switch action, is transmitted to the system microcontroller 50.

At Block 136, if the EDATA flag is set (i.e., the secondary pointing device 16 is being used or was last used), then the mouse switches 20, 22 are ignored (i.e., any response to their status is inhibited) by the first microcontroller 30 of the primary pointing device 16 but not by the second microcontroller 36 of the secondary pointing device 18. The second microcontroller 36 uses the interpointing device data line 66 to send this secondary mouse data to the first microcontroller 30. The first microcontroller 30 sends this secondary mouse data to the system microcontroller 50 because the EDATA flag indicates that the second pointing device 18 is in use. The first microcontroller 30 is inhibited from responding in any way to the status of either mouse switch 20, 22. These actions ensure that the user may seamlessly transition from using the primary pointing device 16 to using the secondary pointing device 18 and vice versa.

While preferred embodiments of the present invention have been described, it should be appreciated that various modifications may be made by those skilled in the art without departing from the spirit and scope of the present invention. Accordingly, reference should be made to the claims to determine the scope of the present invention.

What is claimed is:

1. An apparatus for enabling a user to use either a primary or a secondary pointing device on a computer, comprising:

(a) means responsive to pointing device actuation for identifying which one of the primary and secondary pointing devices is in use, wherein the pointing device identifying means comprises means for setting a status identifier indicating which one of the primary pointing device and the secondary pointing device is in use; and (b) means for responding to input data from the pointing device in use.

2. The apparatus of claim 1, wherein, when the primary pointing device is in use, the responding means comprises:

(a) a first means for processing input data from the primary pointing device, wherein the first processing means outputs mouse data; and (b) means for transmitting the mouse data to a system microcontroller.

3. The apparatus of claim 2, wherein, when the secondary pointing device is in use, the responding means comprises:

(a) means for inhibiting in the first processing means any response to the status of switch means connected to the first and second pointing device; and (b) means for transmitting input data from the secondary pointing device to the system microcontroller.

4. The apparatus of claim 3, wherein the transmitting means transmits input data sent to the primary pointing device from the primary pointing device to the system microcontroller.

5. The apparatus of claim 1, further comprising a primary pointing device input means and a secondary pointing device input means, wherein responsive to actuation of either the input means of the primary and secondary pointing device the setting means sets the status identifier.

6. The apparatus of claim 5, further comprising a second means for processing data received from the secondary device input means in the secondary pointing device, wherein the second processing means outputs input data for the system microcontroller.

7. An apparatus for enabling a user to use either a primary or a secondary pointing device on a computer, comprising:

(a) computer instructions operative by a microcontroller responsive to pointing device actuation for identifying which one of the primary and secondary pointing devices is in use, wherein the pointing device identifying computer instructions comprises computer instructions to set a status identifier indicating which one of the primary pointing device and the secondary pointing device is in use; and (b) computer instructions operative by a microcontroller for responding to input data from the pointing device in use.

8. The apparatus of claim 7, wherein, when the primary pointing device is in use, the computer instructions for responding to input data comprises:

(a) a first microcontroller for processing input data from the primary pointing device, wherein the first microcontroller outputs mouse data; and (b) computer instructions operative on the first microcontroller to transmit the mouse data to a system microcontroller.

9. The apparatus of claim 8, wherein, when the secondary pointing device is in use, the computer instructions for responding to input data comprises:

(a) computer instructions operative by the first microcontroller to inhibit in the first microcontroller any response to the status of a switch connected to the first and second pointing device; and (b) computer instructions operative by the first microcontroller to transmit input data from the secondary pointing device to the system microcontroller.

10. The apparatus of claim 9, wherein the computer instructions for transmitting data transmits input data sent to the primary pointing device from the primary pointing device to the system microcontroller.

11. The apparatus of claim 7, further comprising a primary pointing device input module and a secondary pointing device input module, wherein responsive to actuation of either input module of the primary and secondary pointing device the computer instructions for setting the status identifier sets the status identifier.

12. The apparatus of claim 11, further comprising a second microcontroller for processing data received from the secondary device input module in the secondary pointing device, wherein the second microcontroller outputs input data for the system microcontroller.

13. A method for transitioning between using a primary pointing device and a secondary pointing device, comprising:

(a) identifying which of the primary or the secondary pointing device is being used, wherein the act of identifying the pointing device in use comprises the act of setting a status identifier indicating which of the primary pointing device and the secondary pointing device is in use;

(b) responding to input data from the pointing device being used.

14. The method of claim 13, wherein the act of responding when the primary pointing device is in use comprises:

(a) processing input data via a first microcontroller, wherein the input data to be processed is provided by the first microcontroller primary pointing device input module and the first microcontroller outputs mouse data; and (b) transmitting the mouse data to a system microcontroller.

15. The method of claim 14, wherein the act of responding when the secondary pointing device is in use comprises:

(a) ignoring switch actions of switch connected to the first and second pointing device; and (b) transmitting input data provided by the secondary pointing device to the system microcontroller.

16. The method of claim 15, further comprising the act of processing data to provide input data for the system microcontroller based on data provided by a secondary pointing device input module in the secondary pointing device.

17. The method of claim 16, further comprising the act of outputting the input data for the system microcontroller to the first microcontroller.

18. The method of claim 15, wherein the act of transmitting transmits input data from the secondary pointing device through the primary pointing device to the system microcontroller.

19. An apparatus for enabling a user to make a transition between using a primary pointing device and a secondary pointing device, comprising:

(a) a first microcontroller and a second microcontroller, wherein the first and second microcontrollers are electrically connected to each other;

(b) a primary pointing device input module connected to the first microcontroller;

(c) a secondary pointing device input module connected to the second microcontroller;

(d) a system microcontroller electrically connected to the first microcontroller;

(e) a first switch and a second switch electrically connected to the first and second microcontrollers;

(f) instructions operative by the first microcontroller to determine which of the primary pointing device and the secondary pointing device is in use; and (g) instructions operative by the first microcontroller to inhibit in the first microcontroller any response to the status of one of the first and second switches, when the secondary pointing device is in use.

20. The apparatus of claim 19, further comprising instructions operative by the first microcontroller to transmit to the system microcontroller data received by the first microcontroller from the second microcontroller.

21. The apparatus of claim 19, further comprising instructions operative by the first microcontroller to transmit mouse data to the system microcontroller.

22. The apparatus of claim 19, further comprising instructions operative by the first microcontroller to cause the first microcontroller to respond to the status of the first and second switches when the primary pointing device is in use, wherein the first microcontroller outputs mouse data.

23. A computer, comprising:

(a) a display;

(b) an input device having a primary and a secondary pointing device;

(c) a system microcontroller connected to the display and the input device;

(d) a first microcontroller for processing data provided by a primary pointing device input module;

(e) computer software instructions operative by a first microcontroller to determine which of the primary pointing device and the secondary pointing device is in use; and (f) computer software instructions operative by the first microcontroller to inhibit any response from the primary pointing device in the status of a switch, when the secondary pointing device is in use, wherein the switch is electrically connected to the first pointing device and the second pointing device.

24. The computer of claim 23, wherein the computer software instructions for determining which pointing device is in use, comprises:

(a) a status indicator;

(b) computer software instructions responsive to input from one of a primary pointing device input module and a secondary pointing device input module for setting a status of the status indicator to indicate which of the primary and the secondary pointing device is in use.

25. The computer of claim 23, wherein the secondary pointing device comprises:

(a) a secondary pointing device input module; and (b) a second microcontroller connected to the secondary pointing device input module, wherein the second microcontroller processes data input via the secondary pointing device input module and outputs input data for the system microcontroller.

26. The computer of claim 25, wherein the second microcontroller is connected to the first microcontroller, and transmits to the first microcontroller the input data for the system microcontroller.

27. The computer of claim 26, wherein a first switch and a second switch are electrically connected to the first and second microcontroller.

28. The computer of claim 27, wherein responsive to the use of the secondary pointing device, the any response of the first microcontroller to actuation of the first switch or the second switch is inhibited.

29. The computer of claim 28, wherein the data transmitter transmits to the system microcontroller the input data from the second microcontroller.

30. A computer, comprising:

(a) a display;

(b) an input device;

(c) a system microcontroller connected to the video display and the keyboard;

(d) a primary pointing device comprising a primary pointing device input module and a first microcontroller, wherein the primary pointing device input module is connected to the first microcontroller and the first microcontroller is connected to the system microcontroller;

(e) a secondary pointing device comprising a secondary pointing device input module and a second microcontroller, wherein the secondary pointing device input module is connected to the second microcontroller and the second microcontroller is connected to the first microcontroller;

(f) at least one mouse switch is connected to both the first and second microcontrollers of the primary and secondary pointing devices;

(g) means responsive to pointing device actuation for identifying which one of the primary and secondary pointing devices is in use; and (h) means for responding to input data from the pointing device in use.

31. The computer of claim 30, wherein, when the primary pointing device is in use, the responding means comprises:

(a) a first microcontroller for processing input data from the primary pointing device, wherein the first microcontroller outputs mouse data; and (b) means for transmitting the mouse data to a system microcontroller.

32. The computer of claim 31, wherein, when the secondary pointing device is in use, the responding means comprises:

(a) means for inhibiting in the first microcontroller any response to the status of the at least one mouse switch connected to the first and second pointing device; and (b) means for transmitting input data from the secondary pointing device to the system microcontroller.

33. The computer of claim 32 wherein the transmitting means comprises means for the second microcontroller to process and output input data received from the second pointing device input module to the first microcontroller.

34. The computer of claim 33, wherein the transmitting means comprises means for the first microcontroller to transmit data received from the second microcontroller to the system microcontroller.

35. The computer of claim 30, wherein the pointing device identifying means comprises means for setting a status identifier indicating which one of the primary pointing device and the secondary pointing device is in use.

36. The computer of claim 35 wherein responsive to actuation of one of the first pointing device input module and the second pointing device input module the setting means sets the status identifier.

37. An apparatus for enabling a user to use either a primary pointing device or a secondary pointing device, comprising:

(a) computer software instructions operative by a first microcontroller to determine which of the primary pointing device and the secondary pointing device is in use; and (b) computer software instructions operative by the first microcontroller to inhibit any response from the primary pointing device to the status of a switch, when the secondary pointing device is in use, wherein the switch is electrically connected to the first pointing device and the second pointing device.

38. The apparatus of claim 37, wherein the computer software instructions for determining which pointing device is in use, comprises:

(a) a status indicator;

(b) computer software instructions responsive to input from one of a primary pointing device input module and a secondary pointing device input module for setting a status of the status indicator to indicate which of the primary and the secondary pointing device is in use.

39. The apparatus of claim 37, wherein the secondary pointing device comprises:

(a) a secondary pointing device input module; and (b) a second microcontroller connected to a secondary pointing device input module, wherein the second microcontroller processes data input via the secondary pointing device input module and outputs input data for the system microcontroller.

40. The apparatus of claim 39, wherein the second microcontroller is connected to the first microcontroller transmits to the first microcontroller the input data for the system microcontroller.

41. The apparatus of claim 40, wherein a first switch and a second switch are electrically connected to the first and second microcontroller.

42. The apparatus of claim 41, wherein responsive to the use of the secondary pointing device, any response of the first microcontroller to actuation of the first switch or the second switch is inhibited.

43. The apparatus of claim 42, further comprising computer software instructions operative by the first microcontroller to transmit to the system microcontroller the input data from the second microcontroller.

44. An apparatus for enabling a user to use either a primary or secondary pointing device on a computer, wherein the primary and secondary pointing device share at least one switch, the apparatus comprising:

(a) computer instructions operative by a microcontroller responsive to pointing device actuation by use of the at least one shared switch for identifying which one of the primary and secondary pointing devices is in use; and (b) computer instructions operative by a microcontroller for responding to input data from the pointing device in use.

* * * * *